United States Patent [19]

Young

[11] Patent Number: 4,960,513
[45] Date of Patent: Oct. 2, 1990

[54] SEPARATOR FOR LIQUIDS OF DIFFERENT DENSITIES

[76] Inventor: James T. Young, 1728 Caron La., Douglasville, Ga. 30134

[21] Appl. No.: 396,122

[22] Filed: Aug. 21, 1989

[51] Int. Cl.⁵ .............................................. C02F 1/40
[52] U.S. Cl. ................................... 210/104; 210/110; 210/115; 210/123; 210/134; 210/533; 210/740
[58] Field of Search ............... 210/740, 744, 800, 104, 210/110, 115, 119, 123, 134, 143, 533, 536

[56] References Cited

U.S. PATENT DOCUMENTS

| | | | |
|---|---|---|---|
| 368,544 | 8/1887 | Morrison | 210/115 |
| 2,609,099 | 9/1952 | Griswold | 210/115 |
| 2,750,000 | 6/1956 | Williams et al. | 210/104 |
| 3,675,771 | 7/1972 | McKee | 210/800 |
| 4,436,630 | 3/1984 | Anderson | 210/119 |
| 4,521,312 | 6/1985 | Anderson | 210/744 |

*Primary Examiner*—W. Gary Jones
*Assistant Examiner*—Christopher Upton
*Attorney, Agent, or Firm*—James B. Middleton

[57] ABSTRACT

A liquid separator allows a mixture of oil and water to separate, then discharges the two fractions. A separating tank is automatically filled when a float indicates a low level. A second float is close to the bottom of the tank and has a density such that the float will just float in water. The presence of oil causes the second float to sink; and, a switch connected to the float operates either a water valve when the float rises, or an oil pump when the density is low. Lowering of the level by discharging fractions causes the first float to indicate a low level to fill the tank again.

2 Claims, 1 Drawing Sheet

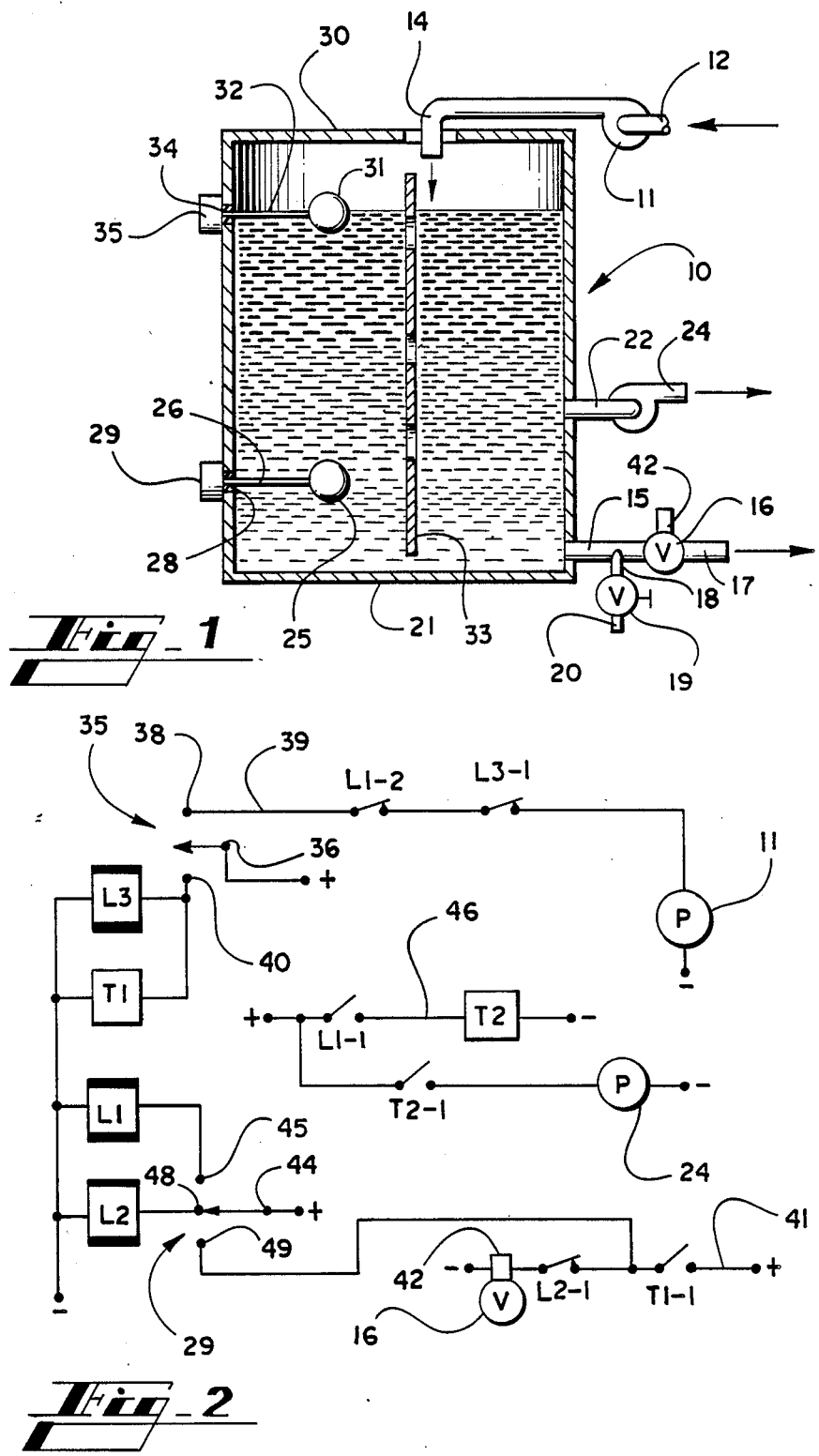

1

SEPARATOR FOR LIQUIDS OF DIFFERENT DENSITIES

INFORMATION DISCLOSURE STATEMENT

It is well known that the bilges in ships collect both water and oil, the water coming from normal seepage and the like, and the oil coming from leakage from the engine and other machinery. In the past, the bilge water has simply been pumped overboard; but, with the present concern for the environment and the increased number of ships, it has been recognized that the oil ought not to be disposed of by dumping it into lakes and seas.

Separation techniques for separating oil and water are well known. Generally, a quantity of the mixed liquid is placed into a tank, and the liquids remain in the tank until the two different liquids separate because their densities are different, and neither is soluble in the other. There has been some use of floats to act as an indicator of the density of the liquid in which the float is immersed. There has also been some effort at continuous separation, but the prior art device uses a pressurized container with a complex fluid handling mechanism to separate different densities of liquids and gas.

To utilize the prior art techniques for separation of oil and water, or other mixtures of liquids having different densities, one must transport the mixed liquids to the separation tank and wait for a long time while the liquids separate. Only after the liquids have completely separated are the different liquids removed from the tank, allowing a new quantity of mixed liquids to be put into the tank for separation. In one prior device a mixture of two different fluids is used to adjust the density of a float, and is discharged as a mixed fluid. Thus, there is no appropriate technique to provide continuous, on site, separation of liquids not soluble in each other and of different densities without discharging mixtures of the fluids.

SUMMARY OF THE INVENTION

This invention relates generally to the separation of liquids, and is more particularly concerned with a method and apparatus for the continuous separation of mixed liquids.

The present invention provides apparatus for receiving a mixed liquid to be separated, the mixed liquid being allowed a predetermined amount of time to separate. After the predetermined amount of time, density indicating means indicate the degree of separation and initiate appropriate discharge of the separated fractions of the mixed liquid. Continued separation because of the different densities, and continued discharge of the separated fractions of the mixed liquid, result in separation of the total quantity of the mixed liquid.

In one embodiment of the invention, mixed liquids are continually pumped into the separating apparatus as space allows and the separation and discharge continue, so the apparatus operates automatically and continuously to separate a supply of mixed liquids.

BRIEF DESCRIPTION OF THE DRAWINGS

These and other features and advantages of the present invention will become apparent from consideration of the following specification when taken in conjunction with the accompanying drawings in which:

FIG. 1 is a somewhat schematic, cross-sectional view showing one form of apparatus made in accordance with the present invention; and, FIG. 2 is a schematic electrical control circuit for use with the apparatus shown in FIG. 1.

DETAILED DESCRIPTION OF THE EMBODIMENT

Referring now more particularly to the drawings, and to that embodiment of the invention here presented by way of illustration, FIG. 1 shows a tank generally designated at 10, the tank 10 acting as a separating tank for receiving mixed liquids to be separated. Individual liquid fractions are discharged from the tank 10 after separation. For transferring the mixed liquids to the tank 10, there is a pump designated at 11 having an intake 12 connected to the source of the mixed liquids. The discharge 14 is within the tank 10.

It is contemplated that the method and apparatus of the present invention will be usable for separating a number of mixed liquids having different densities. It will be recognized by those skilled in the art that the liquids must not be soluble in one another since solutions will not separate in the manner herein discussed. For convenience of discussion, the present application will refer specifically to separation of oil from water as found in the bilge of a ship or the like. This description is intended to be a illustrative only, and in no way limiting.

Looking again at FIG. 1 of the drawings, substantially at the bottom of the tank 10 there is a discharge pipe 15, the discharge pipe 15 having a solenoid-operated valve 16, allowing discharge through the pipe 17. The discharge pipe 15 includes a branch 18 having a manually operated valve 19 for manually draining the system through the pipe 20. Regardless of which valve is used, the valve 16 or the valve 19, it will been seen that liquid at the bottom of the tank 10 can be discharged through the discharge pipe 15. Though the bottom 21 of the tank is here illustrated as flat, it will be understood that the separation can be more efficient by slanting the bottom 21 for providing a small volume portion at the bottom of the tank 10 for collection of water.

Above the bottom 21 of the tank 10 there is an oil discharge pipe 22 leading to the intake side of a pump 24. It will therefore be understood that during normal operation of the system, the relatively heavy liquid in the tank 10 will be discharged through the discharge pipe 15 and the relatively light liquid will be discharged through the discharge pipe 22. It will also be understood that neither liquid should be discharged until the liquids have separated so that no mixed liquid will be discharged from the tank 10. An understanding of the technique to assure separation will be had from the following discussion.

Close to the bottom 21 of the tank 10, there is a float 25 at the end of an arm 26. The arm 26 passes through an appropriate seal 28 and to a switch generally designated at 29. The float 25 will have a carefully adjusted density to cause the float 25 to rise in the heavier liquid and sink in the lighter liquid. Thus, considering the separation of bilge water, it is contemplated that the float 25 will have a density of approximately 0.98 gm/cc. Since the density of water is approximately 1.0 gm/cc, the float 25 will float in water. However the float 25 has a density so close to the density of water that, if the water is mixed with even a little oil or the like, the density of the liquid will fall below 0.98 gm/cc, and the float 25 will sink. As a result, the location of the float 25 within the tank 10 will tend to indicate the upper surface of the water from which all oil has been separated.

Adjacent to the top 30 of the tank 10, there is another float designated at 31. The float 31 is connected to an arm 32 which passes through the wall of the tank 10, sealed by an appropriate seal 34. The arm 32 is then connected to a switch generally designated at 35. The primary purpose of the float 31 is to indicate the level of liquid in the tank 10. As a result, the float 31 preferably has a density of about 0.5 gm/cc. While the float 31 will rise even in gasoline, obviously, if the lightest liquid in the mixture is even lighter than gasoline, an even lower density float 31 may be utilized. Considering the example of the separation of bilge water, it will be understood that the oil commonly found in such marine applications will average around 0.84 to 0.97 gm/cc, so a float 31 having a density of 0.5 gm/cc will always float in the liquid in the tank 10.

From the above description, the operation of the device should be understandable. The pump 11 will transfer mixed liquids from the bilge to the separation tank 10. The pump 11 will operate until the liquid level within the tank 10 is sufficiently high that the float 31 senses the high level and indicates that filling should cease. After the tank has been filled, there will be a time delay to allow separation of the liquids due to their different densities; and, after a predetermined length of time the liquids will be checked to determine if some water can be drained off through the pipe 15, and/or some oil can be discharged through the discharge pipe 22.

The float 25, through operation of the switch 29, will indicate whether or not there is water-alone at the bottom of the tank 10. If the float 25 is in its lowest position, it will be an indication that the density of the liquid is very low even at the bottom of the tank 10, so it will be safe for the pump 24 to operate and discharge oil from the tank. When the float 25 rises to the horizontal position as shown in the drawings, it will be an indication that the water level is substantially at the centerline of the switch 29, and water should not be drained from the tank because the layer of oil, or mixed oil and water, is very close to the discharge pipe 15. When the float 25 rises to its upper position, it is an indication that the bottom of the tank 10 is filled with water, and water can be discharged from the tank through the discharge pipe 15.

The upper float 31 operates the switch 35. When the float 31 is in its lower position it is an indication that the tank 10 needs to be filled with a fresh batch of mixed liquids; however, if the pump 24 is operating at the time, mixed liquid should not be added because some mixed liquid is very likely to be discharged through the discharge pipe 22. If the pump 24 is operating, therefore, the pump 11 will not operate even though the float 31 is in its lowest position. On the other hand, if the float 31 is in its lowest position, and the pump 24 is not operating, then the pump 11 will operate to fill the tank 10.

When the float 31 is in its upper position, it is an indication that the tank 10 is filled, and operation of the pump 11 is terminated.

While the device shown in FIG. 1 and described above is operable, it will be recognized that the floats 25 and 31 may be arranged to operate linearly, vertically, so the arms 26 and 32 will not have to operate through the side wall of the tank 10. The tank 10 is at atmospheric pressure, so no seals will be required if the operating arms of the float pass through the top 30 of the tank 10.

In the use of the present invention, movement of the ship will cause sloshing of the liquid in the tank 10, and can cause delay in complete separation of the liquids. However, it is well known that baffles such as the baffle 33 can be used to prevent the absorbing of the liquid, or to quiet the motion quickly. Numerous forms of baffles are well known in the prior art, and no further discussion is thought to be necessary.

Those skilled in the art will devise numerous control circuits to carry out the process described above, but one simple control circuit is shown in FIG. 2 of the drawings. In FIG. 2, the two pumps 11 and 24 are shown schematically, and carry the same reference numerals as in FIG. 1. Also, the valve 16 is shown schematically and carries the same reference numeral. The switches 29 and 35 are shown, and are designated generally with the same reference numerals.

Looking now at the switch 35, it will be understood that, when the float 31 is in its low position, the switch 35 will connect its common point 36 with the point 38. As a result, current can flow from the source designated by +, through the switch 35, through the line 39, through the two normally closed switches L1-2 and L3-1, then to the pump 11 and to the line designated at -, to operate the pump. Obviously, if either of the normally closed switches is open, the pump 11 cannot operate. When the float 31 is in its upper position, the switch 35 will connect the common point 36 to the point 40 which will energize the relay L3 and the timer T1. The relay L3 operates the switch L3-1, opening the switch to prevent operation of the pump 11.

The timer T1 operates the switch T1-1 in the line 41. The arrangement is such that, after the timer T1 is energized, there will be a predetermined time delay, then the switch T1-1 will be closed. This predetermined delay will be set to the time normally expected for separation of the mixed liquids after they have been placed into the tank 10, at least sufficiently to allow discharge of some of the separated fractions.

If all proceeds as expected, the float 31 will rise, indicating a full tank, and the switch 35 will energize the timer T1 and de-energize the pump 11. After a predetermined length of time, the switch T1-1 will be closed to energize the solenoid 42 on the valve 16, allowing water to be discharged through the discharge pipe 15. This rather straight-forward operation of the upper float 31 is modified by the operation of the float 25.

Looking at FIG. 2 and the switch 29, it will be seen that the common point 44 is connected to the point 45 when the float 25 is in its lowest position. Since the low position indicates that there is oil in the bottom of the tank, the switch 29 will energize the relay L1 which will open switch L1-2 in the line 39 to disable the pump 11, and close the switch L1-1 in the line 46 to energize the timer T2. The timer T2 is arranged so that the switch T2-1 is closed substantially immediately, and remains closed for a predetermined length of time. In this case, the length of time set on the timer T2 will be determined by the time required for the particular pump 24 to pump liquid from the tank 10. When one knows the size of the tank 10 and the capacity of the pump 24, the required length of time can be quite accurately determined.

As the float 25 rises to its mid position, the switch 29 will connect the common point 44 to the point 48, causing the relay L2 to be energized. When the relay L2 is energized, the switch L2-1 will be opened to prevent operation of the solenoid 42, so the valve 16 cannot be opened. Since the mid position of the float 25 indicates that the level of oil, or a mixture of oil and water, is very close to the bottom of the tank, this arrangement prevents discharge of oil through the discharge pipe 15.

As the float 25 rises to its upper position, the common point 44 of the switch 29 will be connected to the point 49. Connection of the points 44 and 49 will energize the solenoid 42 somewhat directly, without waiting for the timer T1 to be energized to close the switch T1-1. When the float 25 is in its upper position, it is clear that the bottom of the tank 10 has water therein, and the water can be discharged through the discharge pipe 15.

It should now be understood that the method and apparatus of the present invention provide an extremely simple continuous and automatic separator for oil and water or other liquids having different densities. The lower float 25 indicates when there is water at the bottom of the tank, and when there is oil or a mixture of oil and water at the bottom of the tank. If there is water in the bottom of the tank, the valve 16 is opened and the water is discharged through the discharge pipe 15. If there is oil in the bottom of the tank, the operation of the pump 24 is enabled, and operation of the fill pump 11 is disabled. If there is a mixture in the bottom of the tank 10, the system simply waits for further separation of the liquids.

In conjunction with the lower float 25, the upper float 31 indicates the level of liquid in the tank, and enables the filling pump 11 unless the pump 24 is already operating. Thus, there will be no inter-mixing of separated liquids with a fresh batch of unseparated liquids.

The embodiment of the invention here presented includes only two floats, separating two fractions of the mixed liquid. The technique however, is readily extendible to a greater number of floats to separate a greater number of fractions of the mixed liquid.

It will therefore be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

I claim:

1. A separator for the automatic continuous separation of liquids having different densities, said separator including a separation tank having a top and a bottom, a source of mixed liquids, means for transferring mixed liquids from said source of mixed liquids to said separation tank, density indicating means adjacent to said bottom of said separation tank, liquid level indicating means adjacent to said top of said separating tank, a first discharge means at said bottom of said separating tank for selectively discharging a high density fraction of said mixed liquid, and a second discharge means above said first discharge means for selectively discharging a low density fraction of said mixed liquid, said density indicating means including means for selectively activating said first discharge means and said second discharge means, said density indicating means including a float, and a first switch actuated by said float, an electrically operated valve for allowing discharge through said first discharge means, and first circuit means connecting said first switch to control said electrically operated valve, said second discharge means including a pump, and second circuit means connecting said first switch to control operation of said pump, said liquid level indicating means including a second float, and a second switch operated by said second float, said means for transferring mixed liquids from said source of mixed liquids to said separation tank including a second pump, and third circuit means connecting said second switch to cause operation of said second pump, said first switch having a first contact that is closed when said float sinks low in said separation tank, said first contact being electrically connected to said second circuit means for causing operation of said pump for discharging a low density fraction of said mixed liquid, a second contact that is closed when said float rises high in said separation tank, said second contact being electrically connected to said first circuit means for causing operation of said valve for discharging a high density fraction of said mixed liquid, and a third contact that is closed when said float is in its mid position, and fourth circuit means connected to said third contact for preventing operation of said valve.

2. A separator as claimed in claim 1, and including fifth circuit means connected to said first contact of said first switch for preventing operation of said second pump.